Figure 1:
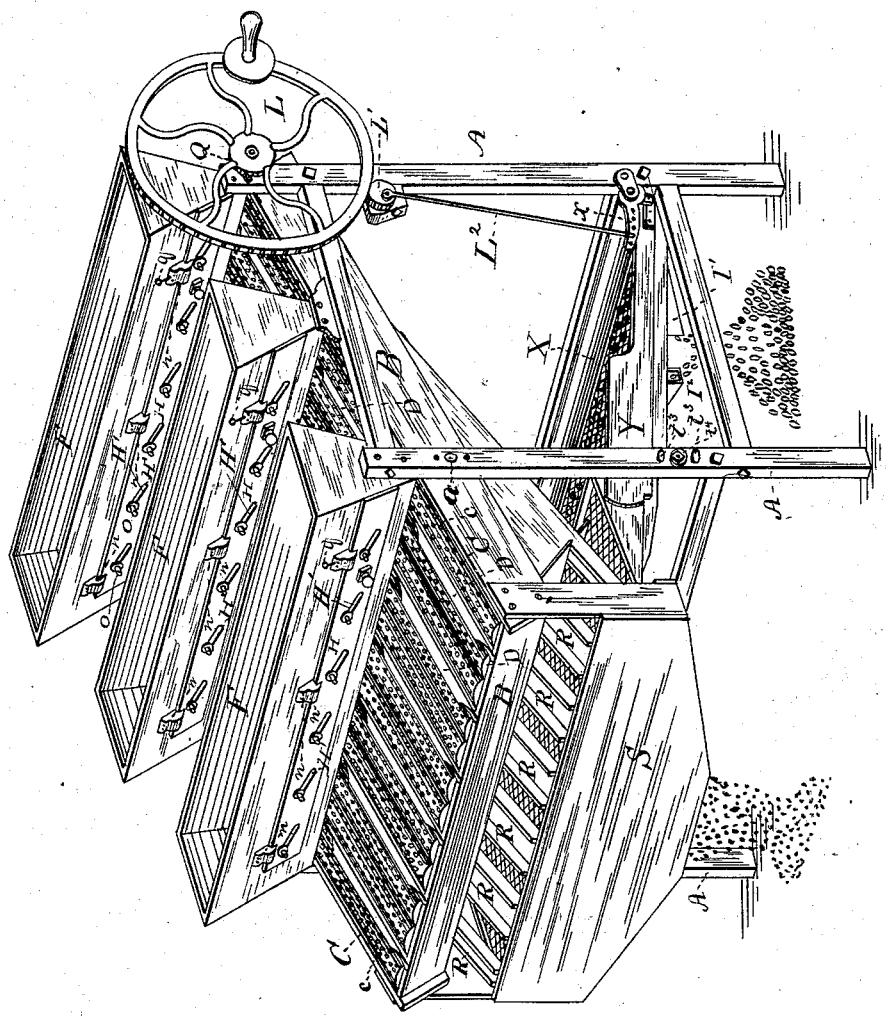

(No Model.) 5 Sheets—Sheet 1.
H. OGBORN.
MACHINE FOR SEPARATING COCKLE, &c., FROM GRAIN.
No. 283,015. Patented Aug. 14, 1883.

WITNESSES
Chas. R. Burr
W. E. Bowen

INVENTOR
Harrison Ogborn.

(No Model.) 5 Sheets—Sheet 2.
H. OGBORN.
MACHINE FOR SEPARATING COCKLE, &c., FROM GRAIN.
No. 283,015. Patented Aug. 14, 1883.
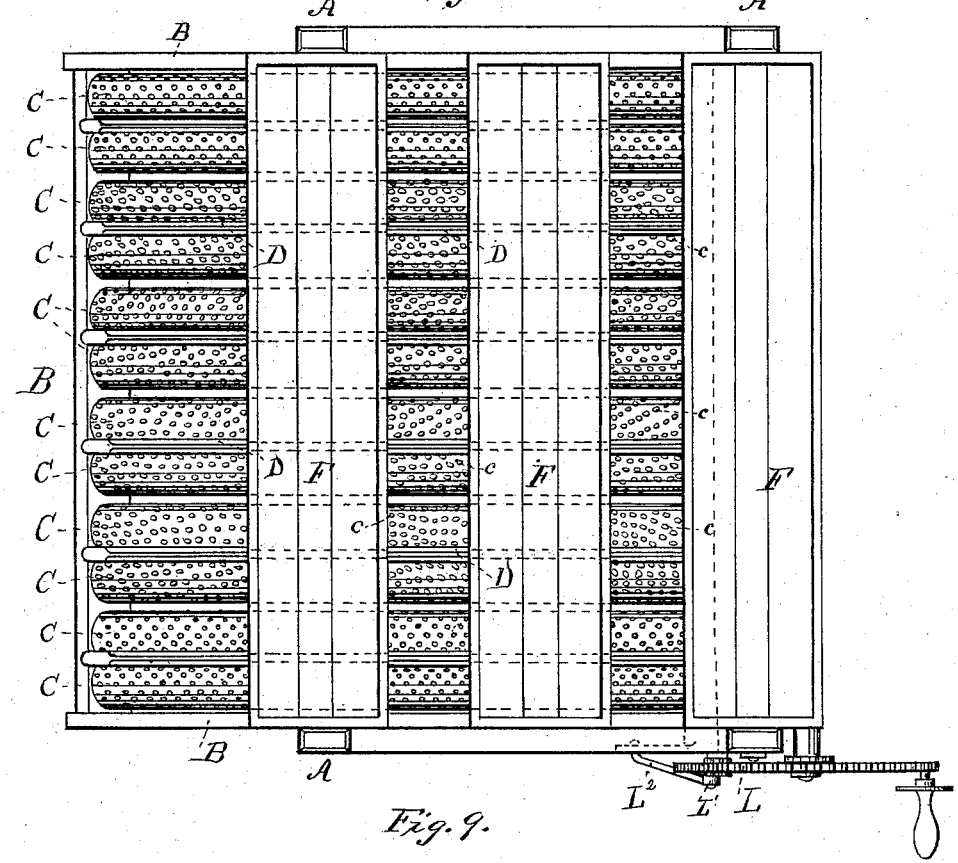
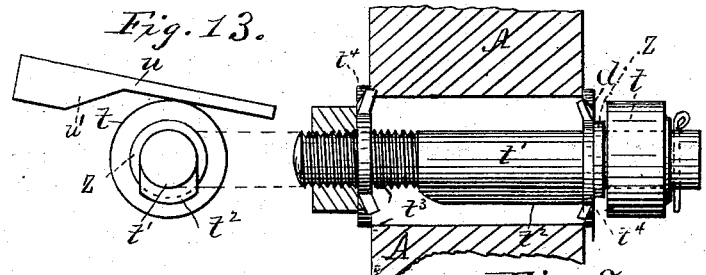
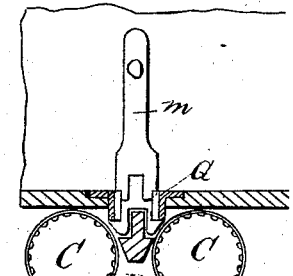
Witnesses:
Chas. R. Burr
W. E. Bowen
Inventor:
Harrison Ogborn.

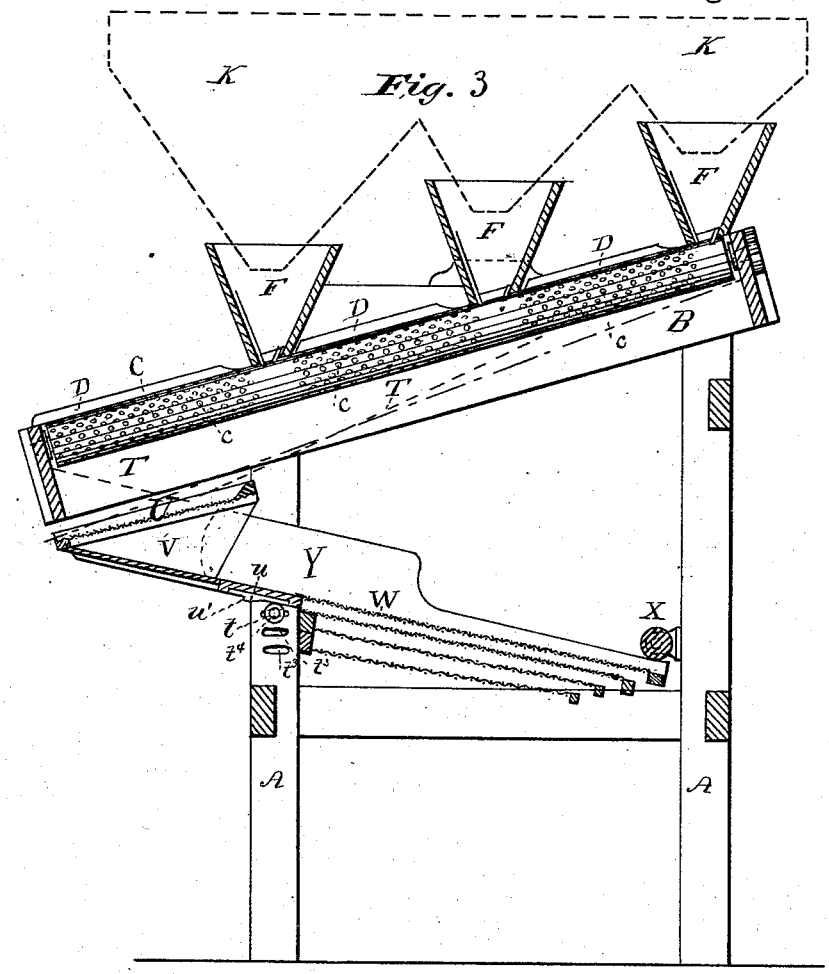
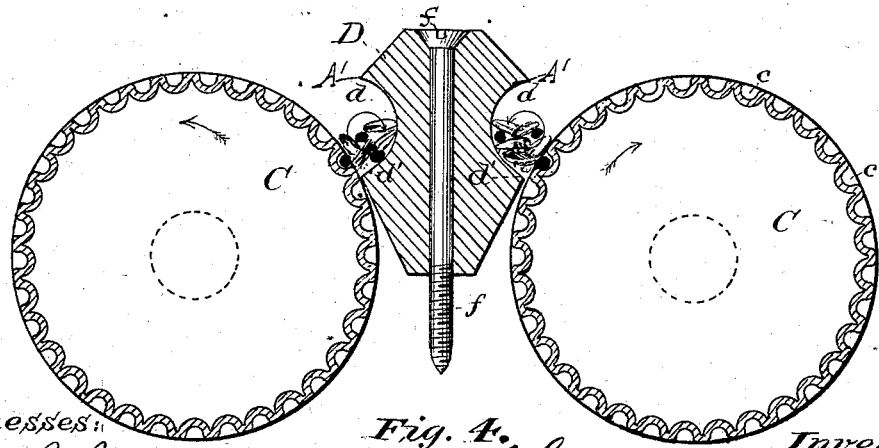

(No Model.) 5 Sheets—Sheet 4.
H. OGBORN.
MACHINE FOR SEPARATING COCKLE, &c., FROM GRAIN.
No. 283,015. Patented Aug. 14, 1883.
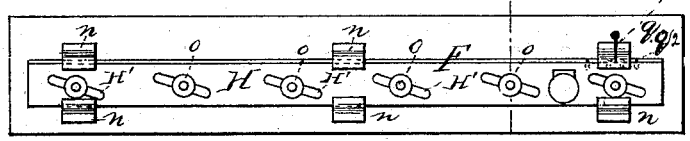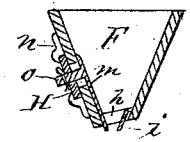
Fig. 6.
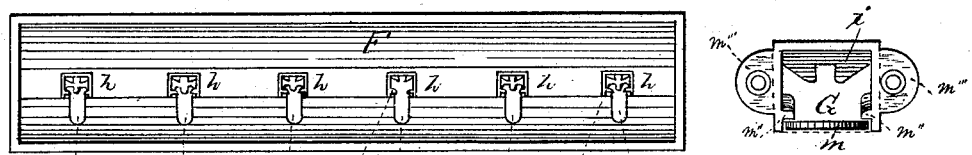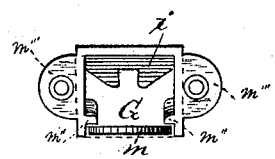
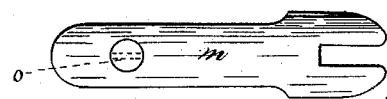
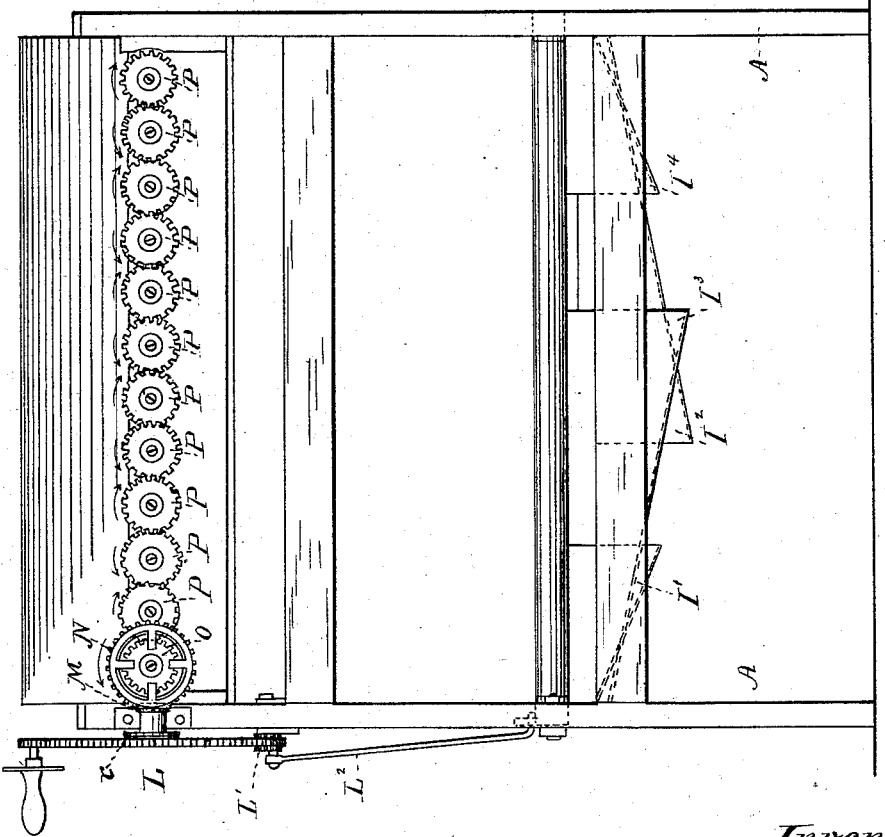
Witnesses:
Chas. R. Burr
W. E. Bowen
Inventor:
Harrison Ogborn.

(No Model.) 5 Sheets—Sheet 5.
H. OGBORN.
MACHINE FOR SEPARATING COCKLE, &c., FROM GRAIN.
No. 283,015. Patented Aug. 14, 1883.
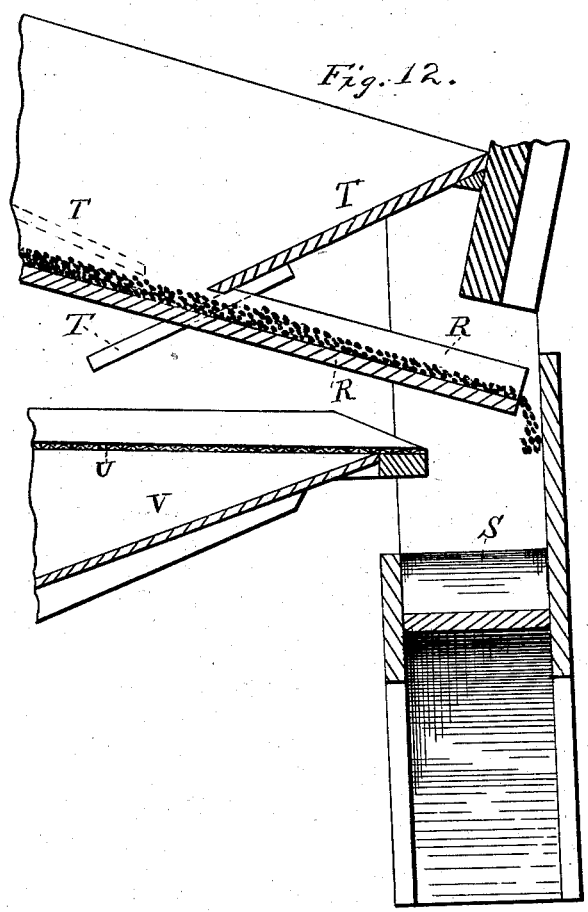
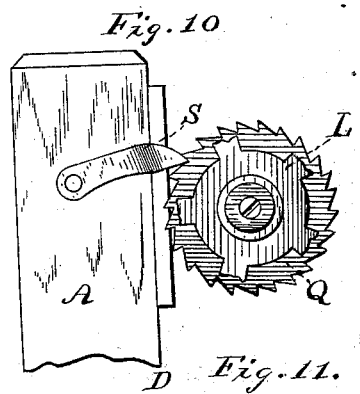
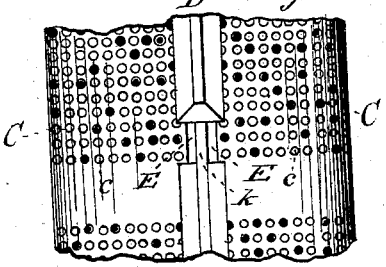
WITNESSES
Chas. R. Burr
W. E. Bowen
INVENTOR
Harrison Ogborn.

UNITED STATES PATENT OFFICE.

HARRISON OGBORN, OF RICHMOND, INDIANA.

MACHINE FOR SEPARATING COCKLE, &c., FROM GRAIN.

SPECIFICATION forming part of Letters Patent No. 283,015, dated August 14, 1883.

Application filed July 5, 1883. (No model.)

*To all whom it may concern:*

Be it known that I, HARRISON OGBORN, of Richmond, Wayne county, and State of Indiana, have invented certain novel and useful improvements in machines for separating cockle, partridge-peas, onion-seeds, garlic, and other foreign seeds and substances from grain, of which the following is a specification in such full, clear, and exact terms as will enable others to construct and use the same, reference being had to the accompanying drawings, forming part of said specification, in which—

Figure 1 is a perspective view of the entire machine according to the preferred construction. Fig. 2 is a plan view of the same. Fig. 3 is a longitudinal vertical section. Fig. 4 is a transverse section, upon an enlarged scale, of a pair of cockle-rollers and a wheat-bar. Fig. 5 is a front elevation of the machine. Fig. 6 is a group of detail views, in plan, elevation, and section, of a hopper and its feed devices. Fig. 7 is a transverse view of a pair of cockle-rolls, C C, showing the position of the feed-slide. Fig. 8 is a detail view, partly in section, of one of the ends of a wheat-bar, showing how it is secured and adjusted upon the frame. Fig. 9 is a detail plan view of one of the roller-supports for the upper end of the screens, the supporting-post and slot being shown in cross-section. Fig. 10 is a detail view of the click or pawl and ratchet-wheel for preventing the cockle-rollers from being turned in the wrong direction and thereby being injured. Fig. 11 is a detail plan view of part of a pair of the cockle-rollers and a wheat-bar, showing how the bar is cut away to permit the escape of the cleaned wheat, and the smooth surface of the rolls at the point where the grain to be cleaned is fed to the next section of indented surface. Fig. 12 is a detail vertical sectional view of the cockle-discharge. Fig. 13 is a detail sectional view of one of the anti-friction rollers supporting the upper end of the screens and the stud-journal for said roller, and the burred washers for holding the bolt in any position horizontally that may be desired.

My invention relates to a novel construction and arrangement of cockle-cylinders; to a novel feed apparatus for the same; to novel means for preventing injury to the cockle-cylinders; to a novel arrangement of wheat and cockle chutes, and to a novel movement for the screens for further cleaning the grain; and it consists in certain features of construction and combination hereinafter more particularly described, and set forth in the claims appended.

Upon a suitable rectangular frame having four uprights, A A, Fig. 1, is mounted an inclined frame, B B, Fig. 3, carrying the cockle-rollers C C. The frame B is capable of adjustment as to inclination by means of adjustment holes and pins $a$ at either side, as shown in Fig. 1, the upper end being pivotally supported. This feature of adjustment may, however, be omitted, the frame being secured at the proper average of inclination; or the legs A may be adjusted as to length, or the two rear legs simply chocked in any suitable way.

The cockle-rollers C C, I prefer to arrange side by side in pairs, inclined from end to end to cause the travel of the grain. Each roller C is a sheet or other metal cylinder roll or roller of small diameter,—not more than three or four inches is found the best—having a true cylindrical external surface covered with depressions or indentations $c\ c$, Figs. 1, 2, 3, forming pockets of sufficient size and depth to retain and lift a grain of cockle, as illustrated in Fig. 4, or a broken fragment of wheat-grain, while permitting the whole wheat-grains to fall back. Between each pair of two such rollers is arranged a bar or fender, D, Figs. 1, 2, 3, 4, presenting a perfectly straight edge to the roller at each side at an angle, say, of thirty to thirty-five degrees above the axis of the rollers. This bar is symmetrical in cross-section, presenting a doubly-beveled edge at the top to prevent the lodgment of any stray grains thereon, and being formed at each side with a deep longitudinal groove, $d$. This groove is concave in the arc of a small circle, except at the lower side, which is formed as a straight incline of about thirty to forty-five degrees from the horizontal, so as to shed the cockle-grains with facility into the ascending pockets. This groove, therefore, in connection with the cockle-roller, forms an inclined trough, down which flows the stream of mingled cockle and grain, to which the revolution of the cockle-roll imparts a slow spiral rotation, facilitated by the concave overhanging lip or part $A'$, Fig. 4, of the groove $d$, Fig. 4. This overhanging part $A'$ of the groove, moreover, prevents grain from escaping over the wheat-bar. The stream of grain rolls over and over, and every grain is presented repeatedly to the cockle-roller. The wheat passes onward to its discharge-openings E E in the bar, (see Fig. 11,) while the cockle is carried over the rolls and dropped into chutes, hereinafter described. We have found that every grain of cockle is removed within a very few inches of travel.

The wheat-bar is adjusted to and kept parallel with the surfaces of the rolls by means of set-screws $f$, Figs. 4 and 8, at each end of each bar passing through intervening blocks or cushions, $g$, of india-rubber or other elastic substance, into the cross-pieces of the supporting-frame B, Fig. 8.

Owing to the rapid elimination of the cockle, we find it expedient to construct the cockle-rollers with two or more successive sections of indented surface, as shown in Figs. 1, 3, and 11, a zone of smooth or plain surface being left at the upper end of each indented section at the point where the grain drops from the hoppers to the rollers. If the indented surface extended beneath the hopper, the wheat-grains would be caught and crushed or cut between the feeding devices (hereinafter described) and the edges of the pockets. Above these smooth zones I arrange two or more hoppers, according to the number of indented sections on each roller, and the grain is independently fed and treated upon each section.

It is obvious that a single cockle-roller may be employed in connection with a wheat-bar having a single groove.

The cleaned wheat is discharged through a recess, E, cut in the side of the wheat-bar, near the lower end thereof, and at points corresponding to the lower end of each indented section. In order to obtain for my machine the greatest capacity, I propose to arrange these cockle-rollers in parallel sets, as shown in Figs. 1, 2, 3, and 5, with a single feed-hopper, F, for the corresponding sections of all the cockle-rollers, said hopper running transversely across the entire series of rollers.

In the machine illustrated in the drawings the rollers are formed with three indented sections and zones of smooth surface, and there are three hoppers, F, which are fed either from a bin or hopper, K, Fig. 3, common to the three, or by hand from a sack or measure. Each of these hoppers F is substantially V-formed in cross-section, Fig. 6, and has a narrow flat bottom, in which are cut square openings $h\ h$, one opening for each pair of rollers, said openings being directly above the wheat-bar and extending across it. In each of these openings is inserted from above a casting, G, Fig. 6, having a flange, $m''$, on three sides, and perforated lugs $m'''$, with which to fit and secure it in position with screws or nails. At the upper side it is formed with a forked downward projection, $i$, shaped to substantially correspond to the adjacent rollers, while the recess of the fork straddles the wheat-bar D to close the grooves $d$ and prevent the escape of the grain rearward. (Where a single cockle roller and bar is used, the form of the casting G is correspondingly modified.) At the lower side of the casting G are formed two ribs, $l\ l$ $m''\ m''$, at a little distance from the edge. These ribs, when casting G is inserted in position in opening $h$, form guides for a forked seed-slide, $m$, which straddles the wheat-bar and closes the two throats formed thereby in connection with the cockle-rollers. The smooth zones of said rollers pass very close to the lower edges of the sides of castings G, and the grain can only escape through the openings controlled by the feed-slide $m$. All the slides $m$ of each hopper are adjusted up and down simultaneously by means of horizontal bar H, provided with a knob or handle, as shown, within convenient reach of the operator, and sliding back and forth in guides $n$ upon the outside of the hopper F. Each of the feed-slides $m$ is connected with bar H by means of a lug, $o$, passing through a vertical slot in the wall of the hopper, and through a longer inclined slot, H', of equal vertical height in the bar H, said lug being suitably secured on the outside of bar H by washers and pins or other means permitting free movement of the parts.

It will be seen that the longitudinal movement, back or forth, of the bar H will cause the simultaneous upward or downward movement of the feed-slides $m$. To secure their adjustment at any desired height, a pin, $q$, passes through a perforation in one of the guides $n$ into any one of a number of adjustment-holes $q^2$, Fig 6, in the upper edge of the feed-bar H. (Shown in dotted lines in Fig. 6.)

It is obvious that the hoppers F might be given a shake or knock through suitable mechanism connected with the drive-wheel, for causing the feed to be steady; but it is found in practice that the movement of the pitted rollers and the tremor caused by the operation of the machine is sufficient for this purpose.

L is a driving-wheel with a toothed rim for communicating motion to the screens, as hereinafter described. It is rigidly connected with a small bevel-pinion, M, keyed or cast upon the same shaft or sleeve with the driving-wheel, said bevel-pinion engaging a larger bevel-gear wheel, N, on the shaft of the first cockle-roller. Rigidly connected with this bevel-wheel N is a pinion, O, transmitting motion of the required speed, and in the direction indicated by the arrows, to a train of similar pinions, P P, Fig. 5, upon the shafts of the other cockle-rollers.

The advantages of the hollow sheet-metal cockle-rollers employed in this machine, having indented or pitted surfaces alternating with smooth zones, Fig. 4, are cheapness, lightness, enabling many to be easily operated in a set, facility of manufacture, and convenience in repairing when accidentally crushed or bent inward by the intrusion of any foreign substance—as a stick, stone, or tool—as they can be readily removed and placed upon a mandrel and their form restored; and each roller may be made to do the work of two or more single rollers without duplicating the driving mechanism, the smooth zones thereon permitting the use of several feed-hoppers at the same time.

If the rollers were accidentally turned in the wrong direction—that is, caused to revolve toward the wheat-bars instead of away from them—the grain, &c., would become wedged between the rollers and the bars and both the rollers and the bars injured. To prevent this I have mounted upon the shaft of the driving-wheel L a ratchet-wheel, Q, the teeth of which are engaged by a spring or gravitating pawl, $s$, pivoted to the frame-work of the machine, (see Figs. 1 and 10,) thus preventing the shafts of the machine from being rotated in the wrong direction. Other locations of the ratchet and pawl and other forms of clutch or brake mechanism for preventing the wrong revolution of the shafts will readily suggest themselves. It is plain, also, that this safety appliance would have the same value in machines where one indented cylinder and bar are used instead of several cylinders and wheat-bars.

A separate discharge-chute, R, for the cockle and other foreign substances is arranged beneath the adjacent rolls of each two pairs, Fig. 1, and one for each outside roll; and these chutes R all discharge into one and the same spout, S, of any desired form, at the rear of the machine. Alternating with said chutes R are hoppers formed of two oppositely-inclined chutes, T T, Figs. 3 and 12, the rear chutes being inclined oppositely to cockle-chutes R, and the front ones being longer and extending downwardly toward the rear, the two sets forming means through which the wheat is discharged upon the short sieve U. Sieve U relieves the wheat of large foreign matters—as sticks, stones, straws, &c.—tailing them over the rear into cockle-spout S, while the grain passes through to the oppositely-inclined chess-board V, where it is spread out and distributed to the gang of screens W of long or square meshed wire-cloth or other suitable material, by which it is cleared of dirt, broken grains, and other refuse, graded, and the grades delivered to separate spouts $I'\ I^2\ I^3\ I^4$, (shown in Fig. 5,) at the front of the machine.

The sieve U, chess-board V, and screens W are all mounted in one common frame or shoe, Y, which is connected at its lower end to the arms of a rock-shaft, X, which is actuated from the driving-wheel L by a crank-pinion, L', engaging the toothed rim of said wheel L, and a link, $L^2$, connecting the crank-pinion L' with an adjusting arm, $x$, of the rock-shaft, said arm $x$ being perforated at several points to vary the throw of the screens. At its upper end, on each side, the shoe Y is armed with wearing-plates $u$, each formed on its under side with a projection or shoulder, $u'$, joining the general straight plane of the under face of the plate by an incline, as shown. Each of these plates $u$ rests upon an anti-friction roller, $t$, journaled, so as to effectually resist all jar, upon a stud or bolt, $t'$. This bolt, as shown in Figs. 9 and 13, is formed with an annular stop-shoulder, Z, for both the roller $t$ and the upright A, through which the stud-bolt passes, and with a rib or lug, $t^2$, of a thickness equal to the diameter of the bolt in that portion. This part passes through one of a series of elongated slots, $t^3$, in the upright A. The rib $t^2$ withholds the bolt from rotary movement in the slot when the nut is turned on or off, and the bolt is secured on each side of the upright by means of a washer, $t^4$, burred or roughened on its inner face, so as to bite into the wood of the upright, and a nut, as shown.

When the screen-shoe is given a rapid reciprocation, the shouldered plates $u$, riding upon the rollers, are caused not merely to rise and fall at the upper or feed end, but forcibly to bounce up or move vertically in its forward movement and fall with a jolt in its backward movement thus effectually jarring the falling material and spreading it into a layer of the thickness of a single grain, so that, especially when the long-meshed wire-cloth is used, the grain assumes the proper order and position for screening. This jarring motion of the screens also causes the refuse to pass through the screens rapidly, and prevents their clogging when in use. By adjusting the bolt $t'$ horizontally from front toward the rear in the slots $t^3$, the bounce or jar may be increased, diminished, or done away with altogether. When the roller is moved forward by moving the bolt in the supporting-slot, it rolls on the smooth part of plate $u$, and the jar is entirely dispensed with, and by moving the bolt and roller toward the rear of the machine any degree of jar or jolt necessary can be secured; and the farther the roller is removed to the rear of the machine the greater elevation will be given the plate and screens by reason of the incline $u'$ on the plate $u$. The perforated arm X, Fig. 1, being a section of a circle centering at the upper end of connecting-rod or link $L^2$, the position of the screens longitudinally at the middle of the stroke are not changed by changing the length of the shake of the screens. The inclination of the screen-shoe may be altered by the use of the different adjustment-holes $t^3$ for the bolt $t'$.

It is plain that, so far as concerns the shouldered plates and rollers, a single one of each, instead of two, may be employed by simply attaching the plate and roller under the middle of the head of the screens instead of at the sides.

My machine is especially valuable for cleaning seed-wheat, rye, and barley. It will remove cockle-seed, partridge-peas, and similar foul seed; and by making the pockets of suitable size it is equally effective in freeing flax-seed or other similar grains from mustard, rape, and other small seeds and foreign matters. For separating oats from wheat, rye, and barley, I construct rolls similar to those described, except that in lieu of the round indentations thereon I make oblong pits or indentations of the proper size and shape to receive the grains of wheat, rye, or barley, but not of sufficient length to receive the grains of oats. The machine being operated as described, the grains of wheat, rye, or barley are picked up and carried over into the cockle-spouts, while the oats pass down the grain-bar and are discharged into the wheat-chutes.

The number of the rolls, their arrangement, singly or in pairs or sets, side by side, or in banks, and above one another, and the number of indented or smooth sections or zones in each roll, are matters which do not affect the essence of the invention, and may be varied as circumstances may require.

Having thus described my invention, what I claim as new, and desire to secure by Letters Patent, is—

1. The combination of an externally-indented roller and a bar grooved upon the side adjacent to the roll, and forming in connection therewith a conduit in which the stream of grain is held against the roll and its escape laterally prevented, substantially as set forth.

2. The combination of an externally-indented roller and a bar, said bar being constructed with a lip or edge, A', overhanging the portion of the bar which is adjacent to the roller, substantially as set forth.

3. The combination of an indented cylinder and a grooved bar, forming in conjunction therewith a trough which conducts the material to be treated, said groove having a curved concave cross-section adapted to permit the stream of material to be rolled over and over by the action of the roller and thoroughly treated, substantially as set forth.

4. The combination of an indented cylinder and a grooved bar, forming in conjunction with said cylinder a trough which conducts the material to be treated, said groove in the bar having a general curved concave cross-section, but with the lower edge formed as an inclined plane, making an angle with the surface of the cylinder, substantially as and for the purpose set forth.

5. The combination of an indented cylinder and a bar, said bar being at one point recessed or cut away to permit the escape of the material after treatment, substantially as set forth.

6. The combination of a feed-hopper, an indented cylinder having a zoned surface and projecting beneath said hopper and in close proximity thereto, the zone or portion of the cylinder so projecting being devoid of indentations, and means for holding the material against said cylinder, substantially as and for the purpose set forth.

7. The combination of an indented cylinder, a bar adjacent to the surface thereof for retaining the material under treatment, and means for adjusting the said bar with respect to said cylinder, substantially as and for the purpose set forth.

8. The combination of an indented cylinder, a bar adjacent to the surface thereof for retaining the material under treatment, a supporting-frame, elastic cushion $g$, and adjusting-screws $f$, connecting said bar to the supporting-frame, substantially as set forth.

9. The combination of an indented cylinder, a retaining-bar for the material, constructed at intervals in its length to permit the escape of the material which has not been removed by the indentations, and independent feed apparatus for the several portions of the cylinder and bar, substantially as and for the purpose set forth.

10. The combination of a series of indented cylinders arranged side by side, a series of retaining-bars operating in connection therewith, as described, and a single feed-hopper common to all, substantially as set forth.

11. The combination of two indented cylinders and a retaining-bar common to both arranged in a plane between the two, substantially as set forth.

12. The combination of an indented cylinder, means for forming, in connection with said cylinder, a trough for the material treated, and means, substantially as described, for preventing the rotation of the cylinder in the wrong direction, substantially as set forth.

13. The combination of the indented cylinder, the wheat-bar, mechanism for rotating said cylinder, and a ratchet-wheel and pawl for preventing the reversal of the motion of the cylinder, substantially as set forth.

14. The combination of the hopper F, having perforated bottom, the casting G, formed with forked projections, the cockle-rolls, and the intervening wheat-bar, substantially as and for the purpose set forth.

15. The combination, with the hopper F, having perforated bottom, the feed-slide, the cockle-rolls, and the wheat-bar, of the casting G, formed with a flange for sustaining it, perforated lugs for adapting it to be secured to the hopper-bottom, and ribs forming guides for said feed-slide, substantially as set forth.

16. The combination of the hopper F, having perforated bottom, the cockle-rolls, the wheat-bar between the cockle-rolls, and the feed-slide straddling the wheat-bar, substantially as and for the purpose set forth 17. The combination, with a series of indented rollers, of means whereby the grain is held against said rollers for treatment, a hopper common to all the rollers, feed-slides controlling the feed-supply to each cylinder, and means whereby all of said slides are simultaneously adjusted, substantially as set forth.

18. The combination of the hopper having perforated bottom and slotted side wall, the feed-slides, the connecting bolts or lugs, and the horizontal sliding bar formed with inclined slots, substantially as set forth.

19. The combination of the hopper having perforated bottom and slotted side walls, a feed-slide, the connecting bolts or lugs, the bar H, formed with inclined slots and adjustment-holes, the guides $n$, and the removable pins, substantially as and for the purpose set forth.

20. The combination of the inclined cockle-rolls, wheat-bars, the cockle-chutes R below the spaces between the rolls, and the spout S, receiving from all the chutes, substantially as set forth.

21. The combination of the pairs of cockle-cylinders, the wheat-bars, the cockle-chutes arranged below the spaces between the pairs of cylinders, and the oppositely-inclined chutes, T, for the grain, alternating with the cockle-chutes, substantially as set forth.

22. The combination of a feed-hopper, a series of cockle-rolls and wheat-bars, arranged as described, a series of chutes for receiving the separated grain, and a screen or screens arranged below said cockle-rolls and receiving the grain from the chutes, substantially as set forth.

23. The combination of an inclined screen, $a$, plate or plates on the under side thereof at the upper end, said plate or plates being formed with a straight lower face and a shoulder joining said face by an incline, a friction roll or rolls supporting said plate or plates, and means for reciprocating the screens, substantially as set forth.

24. The combination of the inclined screens, the bearing-plates at the upper end thereof, having each a straight under face and a shoulder joining said face by an incline, the supporting friction-rolls, a rock-shaft having an adjustable arm, a connecting-link, and means for imparting reciprocation to said link, substantially as set forth.

25. The combination of the screens, the supporting friction-roll, the removable stud or bolt, formed with a stop or shoulder and a rib, $t^2$, the post A, perforated in two or more places, the burred washer, and the tightening-nut, substantially as set forth.

26. The combination of an inclined screen-shoe, means for agitating it, connected with its lower end, the shouldered bearing plate or plates at the upper end of said shoe, and supporting friction roller or rollers, upon which said plate or plates rest and which are adjustable longitudinally of the shoe to vary the operation, substantially as set forth.

27. The combination of an inclined shoe, means for actuating it, connected with its lower end, a shoulder or projection formed at the upper end, a support which said projection strikes, and means for adjusting said projection lengthwise of the shoe for varying the operation, substantially as set forth.

28. The combination of the inclined screen or screens, means for actuating said screen or screens at the lower end, the friction roller or rollers supporting the upper end, a shaft or bearing for said roller or rollers, a support perforated at two or more places at different heights, and detachable means for supporting the roller or rollers at either of these points, substantially as set forth.

HARRISON OGBORN.

Witnesses:
CHAS. R. BURR,
W. E. BOWEN.